United States Patent
Okamoto

[11] Patent Number: 6,147,738
[45] Date of Patent: Nov. 14, 2000

[54] LIQUID CRYSTAL DISPLAY DEVICE AND MANUFACTURING METHOD FOR SAME

[75] Inventor: Mamoru Okamoto, Tokyo, Japan

[73] Assignee: NEC Corporation, Tokyo, Japan

[21] Appl. No.: 09/245,907

[22] Filed: Feb. 8, 1999

[30] Foreign Application Priority Data

Feb. 9, 1998 [JP] Japan .................................. 10-026992

[51] Int. Cl.⁷ .................................................. G02F 1/1335
[52] U.S. Cl. ............................ 349/122; 349/96; 349/141
[58] Field of Search ................. 349/40, 96, 122, 349/141; 313/479, 313

[56] References Cited

U.S. PATENT DOCUMENTS 5,870,160  2/1999  Yanagawa et al. ..................... 349/141

FOREIGN PATENT DOCUMENTS

| | | |
|---|---|---|
| 4-51220 | 2/1992 | Japan . |
| 6-160878 | 6/1994 | Japan . |
| 6-313807 | 11/1994 | Japan . |
| 9-105918 | 4/1997 | Japan . |
| 9-90391 | 4/1997 | Japan . |
| 9-269507 | 10/1997 | Japan . |

*Primary Examiner*—William L. Sikes
*Assistant Examiner*—Tai V. Duong
*Attorney, Agent, or Firm*—Sughrue, Mion, Zinn Macpeak & Seas, PLLC

[57] ABSTRACT

In a liquid crystal display device in which a polarizer is adhered to a transparent glass substrate via an adhesive material, electrically conductive particles are dispersed into and held by an acrylic resin, and the ratio by weight of the electrically conductive particles to the acrylic resin is adjusted to fall in the range from 50% to 80%, so that the resistance value of the adhesive material is in the range from $1 \times 10^3$ to $1 \times 10^6$ $\Omega/\square$.

8 Claims, 3 Drawing Sheets

23 : PROTECTIVE FILM
22 : ANTI-GLARE FILM
21 : TAC FILM
19 : POLARIZER
20 : TAC FILM
24 : ELECTRICALLY CONDUCTIVE ADHESIVE MATERIAL
9 : TRANSPARENT GLASS SUBSTRATE

- 5: SOURCE ELECTRODE
- 3: GATE BUS LINE
- 2: DRAIN BUS LINE
- 5: SOURCE ELECTRODE
- 6: COMMON ELECTRODE

23 : PROTECTIVE FILM
22 : ANTI-GLARE FILM
21 : TAC FILM
19 : POLARIZER
20 : TAC FILM
24 : ELECTRICALLY CONDUCTIVE ADHESIVE MATERIAL
9 : TRANSPARENT GLASS SUBSTRATE 2 5 : ADHESIVE MATERIAL
2 6 : ITO LAYER
2 7 : ITO LAYER

LIQUID CRYSTAL DISPLAY DEVICE AND MANUFACTURING METHOD FOR SAME

BACKGROUND OF THE INVENTION

1. Field of the Invention

The present invention relates to a liquid crystal display device and a manufacturing method for a liquid crystal display device, and more specifically to a transverse-field type of liquid crystal display in which display abnormalities caused by static electricity and the like are prevented.

2. Background of the Invention

A method of driving a liquid crystal display device that controls the liquid crystal by means of a transverse field is indicated, for example, in the Japanese Unexamined Patent Publication (KOKAI) No. 6-160878. Because a feature of a liquid crystal display of this type is that an electrical field is applied in a direction that is parallel to the surface of the liquid crystal cell, the change in the transmissivity of the liquid crystal cell that occurs when the liquid crystal molecules within the liquid crystal cell surface are twisted being used to make a display, in a liquid crystal display device that includes this liquid crystal cell, it is possible to obtain a clear view of an image, even when viewed at a large viewing angle, thereby enabling the achievement of a viewed displayed which is almost independent of the viewing angle.

However, along with a large viewing angle, there is a tendency for the liquid crystal cell to accumulate static electricity externally applied, thereby becoming electrically charged. This is described in detail below.

In the case of a transverse field type of a liquid crystal cell, because the liquid crystal is control by only an electrical field that is applied between a source electrode and a common electrode that are provided in a comb-like pattern on a TFT substrate, there is no electrode such as an ITO (indium tin oxide) electrode on the opposing color filter substrate film.

Therefore, if the surface of the polarizer on the color filter side is touched with the hand, the static electricity of the hand is picked up and passed via the color filter polarizer to the color filter glass substrate, resulting in a potential difference developing between the TFT substrate and the color filter substrate. The liquid crystal molecules, in response to this potential difference, exhibit faulty behavior and charging occurs.

In the past, a method of solving this charging problem, as shown in FIG. 4, was that of using a polarizer which was made by forming an ITO film 26 on the surface of the color filter polarizer, for example, as noted in the Japanese Unexamined Patent Publication (KOKAI) No. 4-51220. With this method, however, there are drawbacks, these being (1) a great increase in cost caused by the use of the sputtering method, (2) the occurrence of a loss of the ITO film because of the concentrated discharge current during ESD (electric static damage) testing, because of the excessively low resistance value of the ITO (sheet resistance is approximately 500 $\Omega/\square$), and (3) a tendency for the color of reflected light from the ITO polarizer to change, because of a change in the ITO film thickness and the resistance value thereof.

Another solution method, as shown in FIG. 5, was that of forming an ITO film 27 on the surface of the color filter, using sputtering. This method, however, has the drawbacks of (1) a great increase in cost caused by the use of the sputtering method, the same as the above-noted method of solution, and (2) difficulty in removing the adhesive glue that remains on the ITO film 27 when the polarizer is peeled away.

There is also the method, as in the Japanese Unexamined Patent Publications (KOKAI) No.6-313807, No.9-90391, and No.9-105918, of imparting electrical conductivity the adhesive material of the polarizer. With this method, however, all that is done is to make the adhesive electrically conductive, and there is no discription with regard to the resistance value, so that there remained the problem of not being able to prevent the loss of the electrically conductive layer when performing ESD testing.

Accordingly, an object of the present invention is to provide a novel liquid crystal display device which is an improvement over the above-noted drawbacks of the prior art, and which in particular not only prevents abnormal displays caused by static electricity, but also is not damaged by a discharge current occurring during an ESD test, and to provide a method of manufacturing the above-noted liquid crystal display device.

Another object of the present invention is to provide a liquid crystal display device which does not tend to exhibit a change in visually apparent color of externally applied light, and a method of manufacturing the above-noted liquid crystal display device.

Yet another object of the present invention is to provide a liquid crystal display device that enables easy exchanging of a polarizer and that is low in cost, and a method of manufacturing the above-noted liquid crystal display device.

SUMMARY OF THE INVENTION

In order to achieve the above-noted objects, the present invention adopts the following basic technical constitution.

Specifically, a first aspect of a liquid crystal display device according to the present invention is a transverse-field type of liquid crystal display device in which a polarizer is adhered to a transparent glass substrate using an adhesive material, wherein electrical conductivity is imparted to said adhesive material, and the resistance value thereof is made to be in the range from $1\times10^3$ to $1\times10^6$ $\Omega/\square$.

In a second aspect of this device, the above-noted adhesive material is formed in the shape of a mesh or a matrix.

The first aspect of a method of manufacturing a liquid crystal display device according to the present invention is a method of manufacturing a liquid crystal display device in which a polarizer is adhered to a transparent glass substrate using an adhesive material, wherein electrically conductive particles are dispersed within and held by an acrylic resin, said electrically conductive particles being adjusted so as to be in a weight ratio of 50% to 80% with respect to said acrylic resin, whereby the resistance value of said adhesive material is in the range from $1\times10^3$ to $1\times10^6$ $\Omega/\square$.

In the second aspect of this method of manufacturing a liquid crystal device is a method of manufacturing a liquid crystal display device in which a polarizer is adhered to a transparent glass substrate using an adhesive material, wherein electrically conductive particles are dispersed within and held by an acrylic resin, the diameter of said electrically conductive particles being made to fall in the range from 0.02 to 2.0 $\mu$m, whereby the resistance value of said adhesive material is in the range from $1\times10^3$ to $1\times10^6$ $\Omega/\square$.

In the third aspect of this method of manufacturing a liquid crystal device is a method of manufacturing a liquid crystal display device in which a polarizer is adhered to a transparent glass substrate using an adhesive material, wherein electrically conductive particles are dispersed within and held by an acrylic resin, and after application of said adhesive material, the solvent thereof is removed at a temperature in the range from 75° C. to 85° C. whereby the resistance value of said adhesive material is in the range from $1\times10^3$ to $1\times10^6$ $\Omega/\square$.

In the fourth aspect of the above-noted method of manufacturing, the electrically conductive particles are electrically conductive inorganic metallic particles such as ITO, $ZnO_2$, or $Sn_2O_3$.

In the fifth aspect of the above-noted method of manufacturing, the electrically conductive particles are electrically conductive organic particles such as polythiophene or polypyrol.

In the sixth aspect of the above-noted method of manufacturing, the electrically conductive particles are formed by a spin-coat method, a dip-coat method, a bar-coat method, or an offset printing method.

A liquid crystal display device according to the present invention is a liquid crystal display device having a polarizer adhered to a transparent substrate with an adhesive material therebetween, electrical conductivity being imparted to the adhesive material, which has a resistance value in the range from $1\times10^3$ to $1\times10^6$ $\Omega/\square$.

In doing this, if the conductivity is higher than indicated above, there will be a local concentration of discharge current at a probe used in an ESD test, thereby resulting in damage by local burning of the conductive layer of the polarizer.

On the other hand, if the conductivity is lower than indicated above, because discharge or cancellation of the static electricity applied to the surface of the polarizer will not occur smoothly, a charge will be accumulated thereon.

DESCRIPTION OF THE PREFERRED EMBODIMENTS

Preferred embodiments of the present invention are described in detail below, with references being made to the relevant accompanying drawings.

Figure 1:
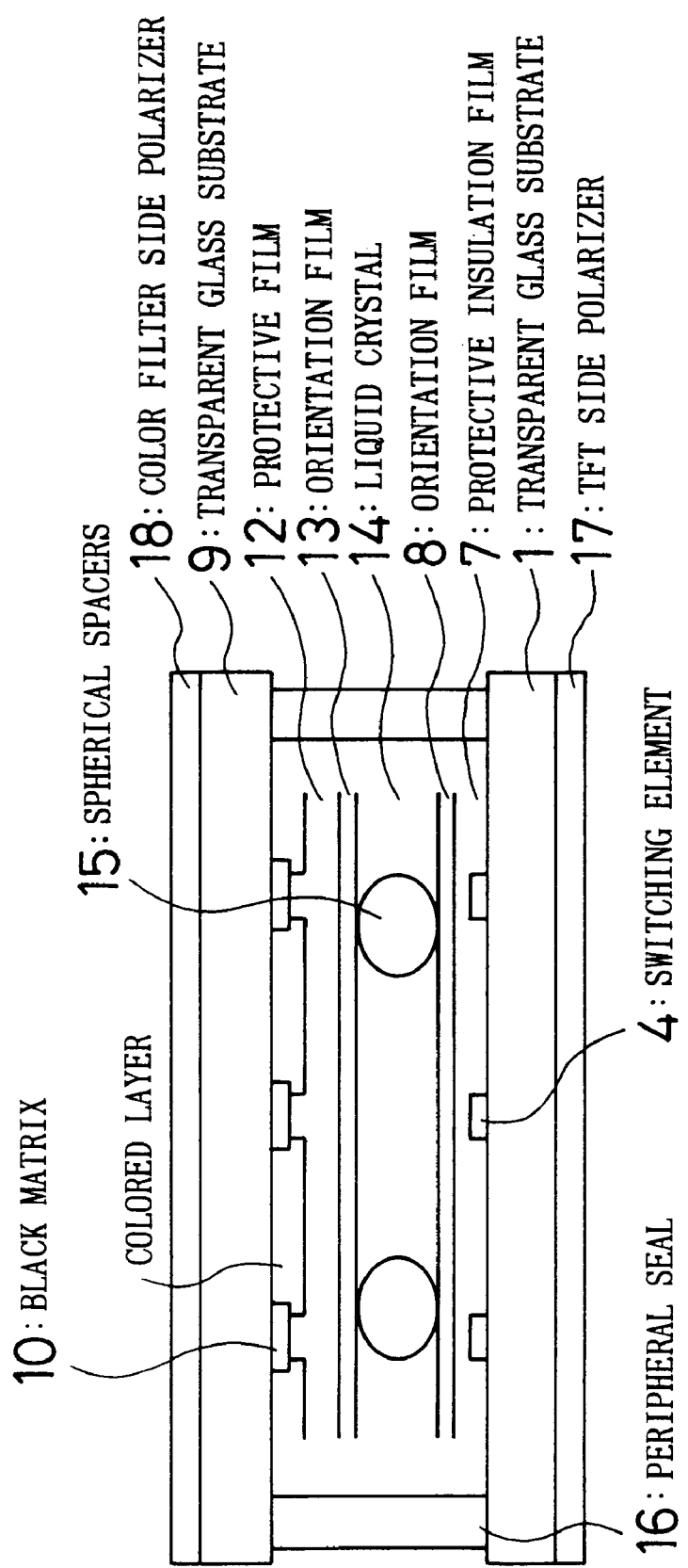
FIG. 1 is a cross-sectional view of a liquid crystal display device according to the present invention.
Figure 2:
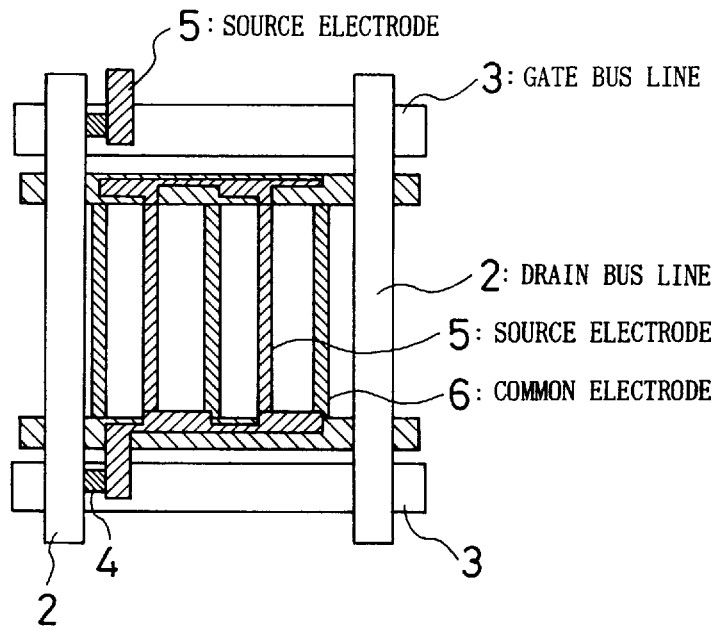
FIG. 2 is a cross-sectional view of a liquid crystal display device according to the present invention that shows an enlarged view of a pixel.
Figure 3:
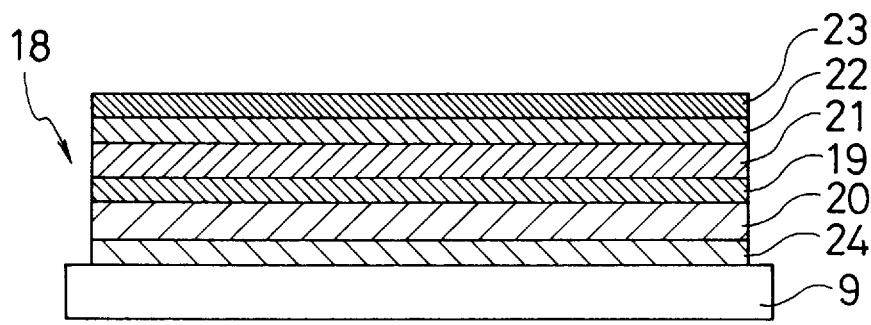
FIG. 3 is a cross-sectional view that shows the condition of a polarizer adhered to a transparent substrate by an intervening layer of adhesive, according to the present invention.
Figure 4:
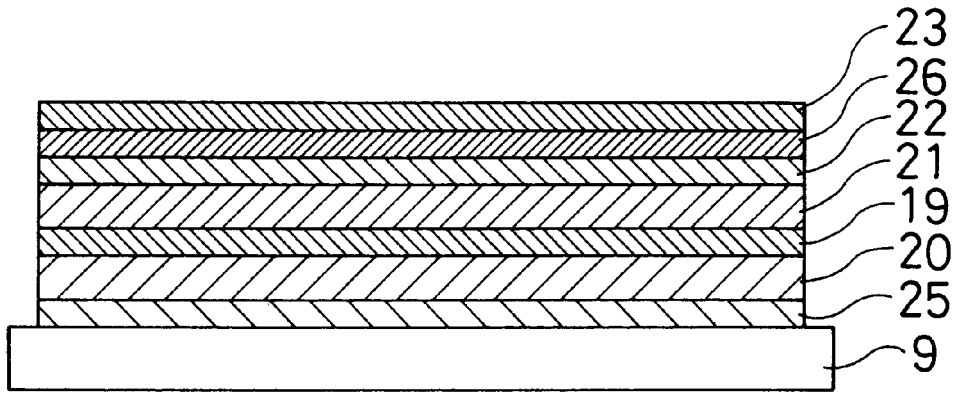
FIG. 4 is a cross-sectional view that shows the prior art.
Figure 5:
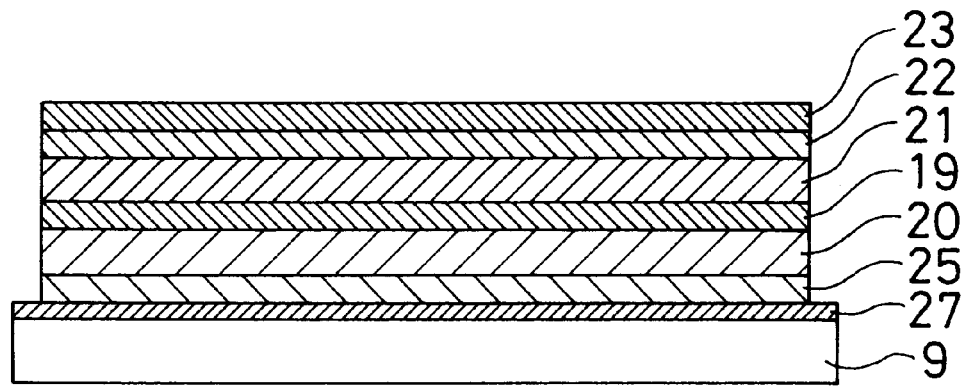
FIG. 5 is a cross-sectional view that shows another example of the prior art.

FIG. 1 through FIG. 3 show the construction of a specific example of the present invention, this being method of manufacturing a liquid crystal display device having a polarizer 18 that is adhered to a transparent substrate 9 via an adhesive material 24, whereby electrically conductive particles are dispersed into and held by an acrylic resin to form the above-noted adhesive material, these electrically conductive particles being adjusted so as to be in a weight ratio of 50% to 80% with respect to the acrylic resin, so that the sheet resistance value of the adhesive material is in the range from $1\times10^3$ to $1\times10^6$ $\Omega/\square$.

Next, the constitution of a liquid crystal display device according to the present invention will be described in detail, with reference to the drawings.

FIG. 1 is a cross-sectional view of a liquid crystal display device according to the present invention, FIG. 2 is a detailed drawing of an active element pixel of a liquid crystal display device according to the present invention, and FIG. 3 is a detailed drawing of the cross-sectional structure of the polarizer in a liquid crystal display device according to the present invention.

First, the substrate 1, which has a TFT as a switching element, will be described. A drain bus line 2 and a gate bus line 3 are respectively formed vertically and horizontally on the transparent glass substrate 1, and the drain bus line 2 is connected to the source electrode 5, via the switching element 4.

The common electrode 6 and the source electrode 5 are formed in the shape of mutually opposing comb teeth, the orientation condition of the liquid crystal being controlled by the electric field that is applied between these two electrodes. A protective insulation film 7 is formed so as to cover these electrodes, and above this an orientation film 8 is formed.

Next, the substrate 9, which has a color filter, will be described.

A black matrix 10, in the form of a matrix, is formed onto the transparent glass substrate 9, colored layers 11 of red, green, and blue being formed as a slab so as to cover the area therebetween. To protect these colored layers 11, a transparent protective film 12 is formed, over which an orientation film 13 is formed.

A liquid crystal 14 having a positive dielectric constant anisotropy is sandwiched in the space between and held by the two above-noted transparent glass substrates 1 and 9, orientation being made via the orientation films 8 and 13, so that the liquid crystal 14 is approximately parallel to the two transparent glass substrates 1 and 9. Spherical spacers 15 are held within the display area and rod-shaped spacers are held in the peripheral seal area 16 in the non-display area to control the cell thickness of the liquid crystal 14.

The polarizers 17 and 18 are attached to the side of the transparent glass substrates 1 and 9 that make contact with the liquid crystal 14 and on the opposites sides thereof. The polarizers 17 and 18 are in the so-called crossed Nicols orientation, so that the transparent axes thereof are mutually perpendicular. The transparent axis of the polarizer 17 is oriented at a prescribed angle so as to coincide with the orientation direction of the liquid crystal 14, and the transparent axis of the other polarizer 18 is oriented so as to be perpendicular to the transparent axis of the polarizer 17.

Next, the structure of the polarizer 18, which is a feature of a liquid crystal display device according to the present invention, will be described. First, a polarizer 19 is held between two triacetyl cellulose (TAC) films 20 and 21, and an anti-glare layer 22, which has been anti-contamination and anti-glare treated, is formed on the surface of one of the TAC films 21, and over this a protective film 23 is adhered. On the surface of the other TAC film 20, an electrically conductive adhesive material 24 is provide, and the polarizer 17,18 are respectively adhered the transparent glass substrates 1 and 9.

Next, a method of manufacturing a liquid crystal display device according to the present invention will be described.

First, a chromium film is formed on the transparent glass substrate 1, using sputtering, and photolithography is used to perform patterning of a gate bus line 3 and a common electrode 6 in the desired shapes. On top of these, the CVD process is used to form a gate insulation film made of silicon nitride and a switching element 4 made of amorphous silicon. Sputtering and photolithography are used to form a drain bus line 2 and a source electrode 5 made of chromium so as to cover part of the switching element 4, and onto the top of this a protective insulation film 7 made of silicon nitride is formed.

Next, an orientation film 8, made chiefly of polyimide (for example, the SUNEVER Series made by Nissan Kagaku), is formed in the desired pattern, using offset printing or other such transfer method, onto the these electrode. After hardening the orientation film 8 by using heat treating, a rubbing roll made of rayon or the like is used to perform orientation in a direction that makes an angle of 15 degrees with respect to the source electrode 5.

Onto the other transparent substrate 9, a black matrix 10, made of either two layers of chromium or a black organic resin, is patterned in the shape of a matrix, by using photolithograpy, so as to cover the gate bus line 3 and the drain bus line 2. On top of the aperture part between two drain bus lines 2, colored layers 11 consisting of three colors of organic dye, that is, R (red), G (green), and B (blue) are patterned in a striped configuration using photolithography. A protective film 12, made of a transparent acrylic resin or the like, is formed for the purpose of preventing staining from impurities from these colored layers 11 and the purpose of providing flatness. The orientation film 13 is formed using the method described above, and orientation is imparted in a direction that makes an angle of 15 degrees with respect to the strip direction of the colored layers 11.

The transparent glass substrates 1 and 9, which have been fabricated up through the steps of orientation, are caused to oppose one another in parallel orientation, spherical spacers having a diameter of 5.5 $\mu$m are distributed within the display area in which the black matrix 10 and colored layers 11 exist, and an epoxy sealant which includes 7.0 $\mu$m rod-shaped spacers being used in the non-display area. The inside of the liquid crystal cell has sealed in it a nematic liquid crystal 14 (for example, the RIKUSON series made by Chisso Co., Ltd.) having a dielectric constant anisotropy of 4.5 and a birefringence $\Delta$n of 0.067.

Next, the polarizer that has an electrically conductive adhesive material 24, which is a feature of a liquid crystal display according to the present invention, will be described in detail.

First, the electrically conductive adhesive material 24 is adjusted according to the following method.

FIRST EXAMPLE

Electrically conductive inorganic metallic particles such as ITO (indium tin oxide), $ZnO_2$, or $Sn_2O_3$ are dispersed into and held by an acrylic resin to form an electrically conductive adhesive material 24. The diameter of these electrically conductive inorganic metallic particles are smaller than the $SiO_2$ (silicon oxide) particles used in the anti-glare layer 22, this being 2 $\mu$m or less and desirably set in the range from 0.02 to 2 $\mu$m, the weight ratio of (electrically conductive inorganic metallic particles)/(acrylic resin) being 50% to 80%. By controlling the weight ratio, the resistance value of the electrically conductive adhesive material 24 is established in the range from $1\times10^3$ to $1\times10^6$ $\Omega/\square$.

The electrically conductive adhesive material 24, which contains these inorganic materials, is applied to the bottom surface of the TAC film 20, which is the base film, using a spin-coat method, a dip-coat method, or a bar-coat method. It is also possible to use an offset printing method or the like to provide the electrically conductive adhesive material 24 in the pattern of a mesh or matrix. After applying the electrically conductive adhesive material 24, the solvent (in this example, the acrylic resin) is removed by heating to a high temperature of approximately 80° C. When removing the solvent, there is a tendency for the resistance value to be lowered more than in the case of drying at room temperature.

Therefore, methods which can be envisioned of controlling the resistance value of the electrically conductive adhesive material 24 include (1) a method of changing the amount of inorganic conductive material, (2) a method of changing the diameter of the electrically conductive particles, and (3) a method of changing the temperature at which the solvent into which the electrically conductive inorganic material was dispersed is removed.

A PVA (polyvinyl alcohol) polymer that is made by absorption orientation of iodine or a dichroic dye is held between the two TAC films 20 and 21 to form the polarizer 19. In order to prevent scattering of reflected external light, the anti-glare layer 22 has particles of $SiO_2$ or the like dispersed therein, and to prevent the accumulation of fingerprints and the like, a fluorine coating is applied onto the surface thereof. Additionally, to prevent damage or contamination during the processing of assembling the liquid crystal cell or module, a peelable protective film 23 is applied. The protective film 23 is peeled away at the final process step in fabricating the module.

While there is no particular restriction on the thicknesses of the above-noted films, in the above-noted example, the thicknesses were approximately 10 $\mu$m for the polarizer 19, approximately 80 $\mu$m for the two TAC films 20 and 21 that hold the polarizer 19 between them, 10 $\mu$m or so for the anti-glare layer 22, approximately 100 $\mu$m for the protective film 23, and approximately 20 $\mu$m for the electrically conductive adhesive layer 24.

A driving method for controlling a liquid crystal by the transverse field method such as in the present invention, as indicated for example in the Japanese Unexamined Patent Publication H6-160878, is that of applying an electrical field in a direction that is parallel to the transparent substrate, so that the liquid crystal is twisted thereby, so as to change the transmissivity of the liquid crystal.

That is, when no electrical field is applied, the molecules of the liquid crystal 14 are at a small angle with respect to the comb-tooth-shaped source electrode 5 and common electrode 6 longitudinal direction. That is, the orientation is such that the angle formed between the long axis of the molecules of the liquid crystal 14 (the optical axis) and the direction of the electrical field (which is perpendicular to the longitudinal direction of the source electrode 5 and the common electrode 6) is 45 degrees or greater, but less than 90 degrees. In this condition, because the birefringence of the molecules of the liquid crystal 14 is zero, the transmitted light intensity is zero. If a voltage is applied to the gate bus line 3 and the switching element 4 is turned on, a voltage is applied to the source electrode 5, so that an electrical field is applied between the source electrode 5 and the common electrode 6, the orientation of the molecules of the liquid crystal 14 changing to that of the direction of this electrical field. The transmission axes of the polarizers 17 and 18 that are positioned on the outside of the two transparent glass substrates 1 and 9 are in crossed Nicols orientation, enabling a change in the intensity of the transmitted light (transmissivity).

If touching the surface of this type of liquid crystal display with the hand or some other cause results in the imparting thereto a static electricity charge, an electrical field develops in a vertical direction between this electrical charge and the electrode that is formed on the transparent glass substrate 1, this causing the possible disturbance of the display by erection of the liquid crystal. That is, similar to the case of vertical drive, the molecules of the liquid crystal are stood up, so that the birefringence effect causes a leakage of light. Without a conductive film on the transparent glass substrate or polarizer, so that the insulated condition is in effect, such a static charge applied from outside the panel does not disperse and remains accumulated for a long period of time. Therefore, the part that is touched by the hand or otherwise receives a static electrical charge is whitened by the leakage of light, this persisting for a long time, resulting in an extreme deterioration of the display.

With the present invention, however, in the case in which electrical conductivity is imparted to a layer that is the adhesive material 24 of a polarizer, the static electricity charge that is accumulated via this electrically conductive adhesive material 24 is passed to ground, so that it does not affect the liquid crystal display panel. For this reason, influence of a static charge from outside the liquid crystal cell is prevented, enabling maintenance of high display quality.

By virtue of the above-noted constitution of the present invention, even if a static electricity charge is imparted by such causes as touching the surface of the polarizer 18 of the liquid crystal display device with the hand, the static charge is not accumulated within the liquid crystal display device, and whitening of the display screen when displaying a black screen, caused by an accumulated charge, is prevented.

The reason for this is that, by imparting electrical conductivity to the adhesive material 24 of the polarizer 18, such as is done in a liquid crystal display device according to the present invention, and by also connecting this to ground, the electrical charge that is imparted from the surface of the polarizer 18 is led to ground via this electrically conductive adhesive material 24, so that a potential difference does not develop between the two transparent glass substrates 1 and 9, and the liquid crystal 14 that is sealed between these substrates is not affected by a vertically oriented electrical field.

Even in the case in which an ESD (electric static discharge) test is performed at the surface of the polarizer 18 of the liquid crystal display device, there is no damage to the surface of the polarizer 18 and accumulation of charge within the liquid crystal cell by the discharge current from the tip of the probe used in the ESD test.

The above-noted ESD test is a test that is performed by setting the surface of the polarizer 18 to the ground potential and applying a voltage from the tip of a probe of (10 kV ten times at an interval of 1 second, after which observation is made as to the degree of charge-up, and the damage condition at the surface of the polarizer 18 that was contacted by the probe tip.

The reason the above effect is achieved is because electrical conductivity is imparted to the adhesive material 24 of polarizer according to the present invention, and also because the resistance of this adhesive material is controlled so as to be in the range from $1 \times 10^3$ to $1 \times 10^6$ $\Omega/\square$.

In this case, if the conductivity is higher than indicated by the above-noted resistance value range, the discharge current from the tip of the ESD test probe will exhibit a local concentration (spark), thereby the electrically conductive layer of the polarizer is locally destroyed due to pinhole damage thereto.

On the other hand, if the conductivity is below that indicated by the above-noted resistance range, the discharge of the static electricity charge imparted to the polarizer surface will not occur smoothly, resulting in an accumulation of charge.

Additionally, according to the present invention it is difficult for light external to the polarizer to cause a change in the color appearance, so that there is no change in the appearance of the display.

The reason for this is that the layer to which electrically conductivity is imparted is within the adhesive material layer, making it difficult to reflect external light. For example, if an electrically conductive material such as ITO is formed on the surface of the polarizer, when external light is reflected at the surface of the polarizer, it is affected by the diameter of the particles of ITO and the thickness of the film, this resulting in a change in the color appearance, making it look bluish or reddish. However, if the layer to which electrical conductivity is imparted is not on the surface of the polarizer but rather within the adhesive material layer, because the color appearance of the reflected light is determined by the condition of the surface, the reflected light is not affected by the diameter of the particles or the film thickness, the result being no change in the appearance of the display.

Another feature of the present invention is that the method of imparting the electrically conductive material is low in cost.

The reason for this is that, compared with the formation of ITO onto the surface of the polarizer using sputtering, as done in the past, the method of the present invention is that of using a spin-coat or dip-coat method to form an electrically conductive material within the adhesive material, this enabling a great reduction in cost.

Another feature of the present invention is that it is easy to exchange the polarizer that is adhered to the transparent glass substrate 9.

The reason for this is that, in the case of a polarizer 18 that uses an electrically conductive adhesive material such as in the present invention, if a need arises to exchange a polarizer 18 once it has been adhered to the transparent glass substrate 9, it is easy to peel it off, and residue of the adhesive material glue or the like is not left on the surface of the transparent glass substrate 9. However, in the case of sputtering an ITO film onto the transparent glass substrate 9 as done in the prior art as a method of preventing charge-up, when the adhered polarizer 18 was peeled off, glue of the adhesive material, which was firmly attached to the ITO film remained on the transparent glass substrate 9, the result being that if an attempt was made to peel off this glue, the ITO film onto the surface of the transparent glass substrate 9 was also peeled off, thereby making it difficult to exchange the polarizer once it is adhered.

Another example of the present invention is described below.

In this example, an electrically conductive organic material such as polythiophene or polypyrol is chemically polymerized and dispersed into an acrylic resin, this being used as the electrically conductive adhesive material 24. In this case as well, by controlling the dispersion amount of the electrically conductive organic material, the resistance value of the resulting electrically conductive adhesive material 24 is adjusted to within the range from $1 \times 10^3$ to $1 \times 10^6$ $\Omega/\square$.

An electrically conductive material 24 that includes these electrically conductive organic materials is formed on the bottom surface of the TAC film 20, that is the base film, using a spin-coat method, a dip-coat method, or a bar coat method of application thereto. It is also possible to use an offset printing method to form the electrically conductive adhesive material 24 in a mesh or matrix pattern. After application of the electrically conductive adhesive material 24, the solvent is removed at a high temperature of approximately to 80° C. When the solvent is removed, there is a tendency for the resistance value to be lowered more than in the case of drying at room temperature.

In this case, methods that can be envisioned of controlling the resistance value of the electrically conductive adhesive material 24 include (1) a method of changing the content of inorganic conductive material, and (2) a method of changing the temperature at which the solvent into which the electrically conductive inorganic material was dispersed is removed.

While the foregoing description used the example of the polarizer 18, it is desirable that application in the same manner is be made to the TFT side polarizer 18 as well.

FIG. 1 shows the constitution of a liquid crystal display device as described above, this device achieving the following effects.

The first effect is that even if a static electricity charge of a high voltage is imparted to the liquid crystal display device by contact by the hand of the polarizer or some other reason, there is no accumulation of the static electricity on the liquid crystal display device and, for this reason, an abnormal display is prevented.

The second effect is that damage is not incurred from the discharge current occurring when an ESD test is performed.

The third effect is that there is no tendency for the color appearance by external light to change, so that the appearance of the display does not change.

The fourth effect is that, because the electrically conductive material is formed within the adhesive material by using a spin-coat or dip-coat method, manufacturing is done at a low cost.

The fifth effect is that it is easy to exchange a polarizer after it is adhered to a transparent glass substrate.

What is claimed is:

1. A transverse-field type of liquid crystal display device in which a polarizer is adhered to a transparent glass substrate using an adhesive material, wherein electrical conductivity is imparted to said adhesive material, and the resistance value thereof is made to be in the range from $1 \times 10^3$ to $1 \times 10^6$ $\Omega/\square$.

2. A liquid crystal display device according to claim 1, wherein said adhesive material is formed in the configuration of a mesh or a matrix.

3. A method of manufacturing a liquid crystal display device in which a polarizer is adhered to a transparent glass substrate using an adhesive material, wherein electrically conductive particles are dispersed within and held by an acrylic resin, said electrically conductive particles being adjusted so as to be in a weight ratio of 50% to 80% with respect to said acrylic resin, whereby the resistance value of said adhesive material is in the range from $1 \times 10^3$ to $1 \times 10^6$ $\Omega/\square$.

4. A method of manufacturing a liquid crystal display device in which a polarizer is adhered to a transparent glass substrate using an adhesive material, wherein electrically conductive particles are dispersed within and held by an acrylic resin, the diameter of said electrically conductive particles being made to fall in the range from 0.02 to 2.0 μm, whereby the resistance value of said adhesive material is in the range from $1 \times 10^3$ to $1 \times 10^6$ $\Omega/\square$.

5. A method of manufacturing a liquid crystal display device in which a polarizer is adhered to a transparent glass substrate using an adhesive material, wherein electrically conductive particles are dispersed within and held by an acrylic resin, and after application of said adhesive material, the solvent thereof is removed at a temperature in the range from 75° C. to 85° C. whereby the resistance value of said adhesive material is in the range from $1 \times 10^3$ to $1 \times 10^6$ $\Omega/\square$.

6. A method of manufacturing a liquid crystal display device according claim 3, wherein said electrically conductive particles are electrically conductive inorganic metallic particles such as ITO, $ZnO_2$, or $Sn_2O_3$.

7. A method of manufacturing a liquid crystal display device according claim 3, wherein said electrically conductive particles are electrically conductive organic particles such as polythiophene or polypyrol.

8. A method of manufacturing a liquid crystal display device according claim 3, wherein said electrically conductive particles are formed by a method selected from a groups consisting of a spin-coat method, a dip-coat method, a bar-coat method, and an offset printing method.

\* \* \* \* \*